United States Patent
Nakhjiri

(10) Patent No.: US 8,539,559 B2
(45) Date of Patent: Sep. 17, 2013

(54) SYSTEM FOR USING AN AUTHORIZATION TOKEN TO SEPARATE AUTHENTICATION AND AUTHORIZATION SERVICES

(75) Inventor: Madjid F. Nakhjiri, Kirkland, WA (US)

(73) Assignee: Futurewei Technologies, Inc., Plano, TX (US)

( * ) Notice: Subject to any disclaimer, the term of this patent is extended or adjusted under 35 U.S.C. 154(b) by 833 days.

(21) Appl. No.: 11/838,377

(22) Filed: Aug. 14, 2007

(65) Prior Publication Data
US 2008/0127317 A1 May 29, 2008

Related U.S. Application Data

(60) Provisional application No. 60/867,377, filed on Nov. 27, 2006.

(51) Int. Cl.
*H04L 29/06* (2006.01)

(52) U.S. Cl.
USPC ........................................ 726/6; 726/4; 726/9

(58) Field of Classification Search
USPC ...................................................... 726/4, 6, 9
See application file for complete search history.

(56) References Cited

U.S. PATENT DOCUMENTS

| | | | |
|---|---|---|---|
| 6,879,690 B2 | 4/2005 | Faccin et al. | |
| 7,069,433 B1 | 6/2006 | Henry et al. | |
| 7,171,555 B1 | 1/2007 | Salowey et al. | |
| 7,181,196 B2 | 2/2007 | Patel | |
| 7,210,163 B2 | 4/2007 | Stoll | |
| 7,210,167 B2 | 4/2007 | Brezak et al. | |
| 2002/0174335 A1 | 11/2002 | Zhang et al. | |
| 2003/0046541 A1 | 3/2003 | Gerdes et al. | |
| 2003/0110375 A1 | 6/2003 | Colvin | |
| 2003/0112977 A1* | 6/2003 | Ray et al. | 380/270 |
| 2003/0211842 A1* | 11/2003 | Kempf et al. | 455/411 |
| 2004/0088544 A1 | 5/2004 | Tariq et al. | |
| 2004/0250119 A1 | 12/2004 | Shelest et al. | |
| 2005/0177733 A1 | 8/2005 | Stadelmann et al. | |
| 2006/0185013 A1* | 8/2006 | Oyama et al. | 726/21 |
| 2006/0236116 A1* | 10/2006 | Patel | 713/183 |
| 2007/0124592 A1 | 5/2007 | Oyama | |
| 2007/0154016 A1* | 7/2007 | Nakhjiri et al. | 380/270 |
| 2007/0209064 A1 | 9/2007 | Qin et al. | |
| 2007/0214498 A1 | 9/2007 | Pindra et al. | |
| 2007/0220598 A1* | 9/2007 | Salowey et al. | 726/10 |

(Continued)

FOREIGN PATENT DOCUMENTS

| | | |
|---|---|---|
| CN | 1329418 A | 1/2002 |
| CN | 1486029 A | 3/2004 |

(Continued)

OTHER PUBLICATIONS

International Search Report, PCT/CN2007/070570, Date of mailing of the international search report Dec. 6, 2007, 2 pages.
English Translation of the Written Opinion of the International Searching Authority, PCT/CN2007/070570, Date of mailing Dec. 6, 2007, 4 pages.

(Continued)

*Primary Examiner* — Ashok Patel
*Assistant Examiner* — Tracy Mangialaschi
(74) *Attorney, Agent, or Firm* — Slater & Matsil, L.L.P.

(57) ABSTRACT

A novel system for utilizing an authorization token to separate authentication and authorization services. The system authenticates a client to an authenticating server; generates an authorization token with the authenticating server and the client; and authorizes services for the client using the generated authorization token.

19 Claims, 2 Drawing Sheets

(56) References Cited

U.S. PATENT DOCUMENTS

| | | | |
|---|---|---|---|
| 2007/0297611 A1 | 12/2007 | Yun et al. |
| 2008/0060065 A1 | 3/2008 | Wynn et al. |
| 2008/0065883 A1 | 3/2008 | Zeng et al. |
| 2008/0127317 A1 | 5/2008 | Nakhjiri |
| 2008/0141031 A1 | 6/2008 | Oba et al. |
| 2008/0175393 A1 | 7/2008 | Oba et al. |
| 2008/0178274 A1 | 7/2008 | Nakhjiri et al. |

FOREIGN PATENT DOCUMENTS

| | | | |
|---|---|---|---|
| CN | 1564626 A | 1/2005 |
| CN | 1674491 A | 9/2005 |
| CN | 1831836 A | 9/2006 |
| CN | 1836417 A | 9/2006 |
| CN | 1836419 A | 9/2006 |
| EP | 1 278 330 A1 | 1/2003 |
| EP | 1 657 943 A1 | 5/2006 |
| KR | 1020050050794 A | 6/2005 |
| WO | WO 01/72009 A2 | 9/2001 |
| WO | WO 0172009 A2 * | 9/2001 |
| WO | WO 2004/112348 A1 | 12/2004 |
| WO | WO 2004/112349 A1 | 12/2004 |
| WO | WO 2005/004433 A1 | 1/2005 |
| WO | WO 2005/109751 A1 | 11/2005 |
| WO | WO 2006/022469 A1 | 3/2006 |
| WO | WO 2006/107713 A1 | 10/2006 |
| WO | WO 2006/118342 A1 | 11/2006 |

OTHER PUBLICATIONS

Chinese Office Action, Application No. 200780042379.0, Dated Apr. 23, 2010, 10 pages.
Narayanan, V., et al., "EAP Extensions for EAP Re-authentication Protocol (ERP)," RFC 5296, Network Working Group, Aug. 2008, 44 pages.
Harkins, D., et al., "Problem Statement and Requirements on a 3-Party Key Distribution Protocol for Handover Keying," Internet-Draft, Network Working Group, Mar. 4, 2007, 17 pages.
Kohl, J. T., et al., "The Evolution of the *Kerberos* Authentication Serivce," presented at EurOpen Conference, Tromso Norway, 1991, 15 pages.
Nakhjiri, M., et al., "A Network Service Identifier for separation of Mobile IPv6 service authorization from Mobile node authentication," Internet-Draft, Network Working Group, Jan. 18, 2007, 19 pages.
Nakhjiri, M., "Keying and signaling for wireless access and handover using EAP (EAP-HR)," Internet-Draft, Network Working Group, Apr. 5, 2007, 23 pages.
Neuman, B. C., et al., "Kerberos: An Authentication Service for Computer Networks," USC/ISI Technical Report No. ISI/RS-94-399, IEEE Communications Magazine, vol. 32, No. 9, Sep. 1994, 10 pages.
Aboba, Bernard et al., "Extensible Authentication Protocol (EAP) Key Management Framework," The IETF Trust, downloaded from http://tools.ietf.org/html/draft-ietf-eap-keying-18, 68 pages, Feb. 7, 2007.
Kaufman, C., "Internet Key Exchange (IKEv2) Protocol," The Internet Society, downloaded from http://tools.ietf.org/html/rfc4306, 98 pages, Dec. 2005.
Salowey, J. et al., Specification for The Derivation of Usage Specific Root Keys (USRK) From An Extended Master Session Key (EMSK), The Internet Society, downloaded from http://tools.ietf.org/html/draft-ietf-hokey-emsk-hierarchy-00, 16 pages, Jan. 11, 2007.
Aboba, B. et al., "The Network Access Identifier," RFC 4282, The Internet Society, 15 pages, Dec. 2005.
Arkko, J. et al., "Extensible Authentication Protocol Method for 3rd Generation Authentication and Key Agreement (EAP-AKA)," RFC 4187, The Internet Society, 74 pages, Jan. 2006.
Giaretta, G., et al., "Mobile IPv6 Bootstrapping in Split Scenario," The IETF Trust, 29 pages, Jul. 22, 2007.
Kim, et al., "Improving Cross-domain Authentication over Wireless Local Area Networks", 2005, IEEE, pp. 1-12.
Lee, et al., "The Design of Dynamic Authorization Model for User centric service in Mobile Environment," Feb. 20-22, 2006, IEEE, pp. 2124-2127.
Aboba, B. et al. "Extensible Authentication Protocol (EAP)," Network Working Group, RFC3748, Jun. 2004, 73 pages.
Carter, G., "PPP EAP ISAKAMP Authentication Protocol," Nov. 19, 1997, retrieved from http://tools.ieft.org/html/draft-ieft-ppext-eapisakmp-00 on May 13, 2011, 22 pages.
Dukes, D. "Proposed Configuration Payload for IKEv2," Dec. 18, 2002, retrieved from http://www.vpnc.org/ietf-mode-cfg/mail-archive/msg00016.html on May 13, 2011, 17 pages.
Vollbrecht, J., et al., RFC4137, "State Machines for Extensible Authentication Protocol (EAP)," Aug. 2005, retrieved from http://www.http://tools.ietf.org/html/rfcs4137 on May 13, 2011, 52 pages.
Cheikhrouhou, O., et al., "Security Architecture in a Multi-Hop Mesh Network," Jun. 2006, 10 pages.
Narayanan, V., et al. "Problem Statement on EAP Efficient Re-Authentication and key Management," draft-vidya-eap-reauth-ps-00, Oct. 15, 2006, retrieved from http://tools.ietf.org/id/draft-vidya-eap-reauth-ps-00.txt on May 13, 2011, 13 pages.
Kafle, V.P., et al., "Extended Correspondent Registration Scheme for Reducing Handover Delay in Mobile IPv6," May 12, 2006, Proceedings of the 7th International Conference on Mobile Data Management (MD'06), IEEE, 5 pages.
Narayanan, V., et al., "EAP Extensions for Efficient Re Authentiaction," draft-vidya-eap-er-02, Jan. 19, 2007, retrieved from http://tools.ietf.org/html/draft-vidya-eap-er-02 on May 13, 2011, 27 pages.
Aboba, B., et al., "Extensible Authentication Protocol (EAP) Key Management Framework," Internet-Draft, EAP Working Group, Feb. 7, 2007, 68 pages.
Clancy, T., et al., RFC5169, Handover Key Management and Re-Authentication Problem Statement, retrieved from http://tools.ieft.org/search/rfc5169, May 13, 2011, 16 pages.
Written Opinion of the International Searching Authority, International Application No. PCT/CN2008/070952, Applicant: Huawei Technologies Co., Ltd., et al., Dated: Aug. 28, 2008, 10 pages.
Chinese Office Action and partial translation received in Chinese Patent Application No. 200780042379.0, mailed Oct. 27, 2011, 12 pages.
European Office Action received in European Patent Application No. 07785467.7-2415, mailed Oct. 11, 2011, 5 pages.
European Office Action received in European Patent Application No. 07785467.7-2415, mailed May 7, 2012, 4 pages.
United States Non-Final Office Action received in U.S. Appl. No. 11/938,048, mailed May 11, 2011, 13 pages.
United States Final Office Action received in U.S. Appl. No. 11/938,048, mailed Oct. 27, 2011, 11 pages.
Zuleger, H., "Mobile Internet Protocol MIPv6 A brief introduction," Holger.Zuleger@hznet.de, Dec. 13, 2005, 15 pages.
Kivistö, M., et al., "802.16e—Mobile WiMAX," IEEE, 28 pages, Apr. 2007.
Sithirasenan, E., et al., "IEEE 802.11i WLAN Security Protocol—A Software Engineer's Model," IEEE, 2005, 12 pages.
Eronen, P., et al., "Diameter Extensible Authentication Protocol (EAP) Application," Network Working Group, Standards Track, RFC 4072, Aug. 2005, 33 pages.
Dondeti, EAP Efficient Re-Authentication, IETF68; Mar. 2007, retrieved from http://www.ietf.org/proceedings/68/slides/hokey-2.pdf on Aug. 29, 2012.
European Office Action, European Application No. 07785467.7, Applicant: Huawei Technologies Co., Ltd., dated Jul. 5, 2012, 4 pages.
European Office Action, European Application No. 07785467.7, Applicant: Huawei Technologies Co., Ltd., dated Nov. 10, 2011, 5 pages.
Aboda, B., et al., "EAP Keying Format," EAP Working Group, Internet-Draft, Category: Informational, Dec. 21, 2002, 23 pages.
U.S. Office Action, U.S. Appl. No. 11/938,048, Applicant: Madhid F. Nakhjiri, dated Dec. 14, 2012, 17 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |   NSI (including Auth_ID)...|
+-+-+-+-+-+-+-+-+-+-+-+-+-+-+-+-+-+-+-+-+-+-+-+-+-+-+-+-+-+-+-+-+
         ....
+-+-+-+-+-+-+-+-+-+-+-+-+-+-+-+-+-+-+-+-+-+-+-+-+-+-+-+-+-+-+-+-+
|   MN_ID   ...........         |         Service_Type          |
+-+-+-+-+-+-+-+-+-+-+-+-+-+-+-+-+-+-+-+-+-+-+-+-+-+-+-+-+-+-+-+-+
|   MAC    ....
+-+-+-+-+-+-+-+-+-+-+-+-+-+-+-+-+-+-+-+-+-+-+-+-+-+-+-+-+-+-+-+-+
```

FIG. 3

SYSTEM FOR USING AN AUTHORIZATION TOKEN TO SEPARATE AUTHENTICATION AND AUTHORIZATION SERVICES

PRIORITY CLAIM

This application claims the priority benefit of U.S. Provisional Application No. 60/867,377, filed Nov. 27, 2006.

TECHNICAL FIELD OF THE INVENTION

The present invention relates generally to telecommunications, and more particularly, to a versatile system for using an authorization token to separate authentication and authorization services.

BACKGROUND OF THE INVENTION

Conventionally, an act of authentication is not separated from an act of authorization. Typically, once an end-user client is authenticated by an authentication server, that user is also authorized by the same server to use a specific service. In the case that authentication and authorization are performed by the same server, the server is capable of performing cryptographic functions related to authentication. It also has access to user credentials and identities; and may be capable of accessing a user's profile and service access rights, as well as interacting with service equipment to see if service may be granted.

As diverse broadband access technologies are increasingly developed and deployed, revenue margins for access providers tend to decrease. Diversity of access technologies also dictates a need for access-independent application and service offerings—such that a service-only provider can deploy a single service-architecture for any user, regardless of underlying access technology, while co-existing with access providers providing only connectivity. Mobile Internet Protocol v6 (MIPv6) operational development is, for example, considering scenarios where a mobility service provider is separate and distinct from an access service provider. Different providers will naturally use different Authenticating, Authentication, and Authorization (AAA) servers, and possibly different AAA infrastructure, to control and manage resource usage and users.

Service provider equipment and infrastructure may be different from network access equipment. For instance, a MIP Home Agent (HA) may be part of a service provider network, while a network access server/Extensible Authentication Protocol (EAP) authenticator may be part of a network access provider. A separation of signaling path for authorization and authentication may be needed in such a configuration.

Conventional systems have typically used the same authentication and authorization credentials. However, this may not be so in the future, if cleaner separation of authentication and authorization functions and servers are developed, and better protection of sensitive authentication credentials against brute force attacks are desired. The less that authentication credentials are used, the better—from a security standpoint. Separation may be especially beneficial since an authentication procedure may typically establish a set of security associations with network boundaries, and later the authorization signaling may be performed over this secure channel using less security-intense authorization credentials.

By way of illustration, consider an analogy of watching a movie at a movie theater. At least for the time being, watching a movie requires only a movie ticket. Showing a movie ticket does not require showing a drivers license, particularly when a person may have already shown a drivers license in conjunction with paying for the ticket (e.g., with a credit card).

Another approach is being developed in the Internet Engineering Task force (IETF) to address issues arising in conjunction with this new trend—one where no proof of prior authentication is provided to an authorizing server. This approach is obviously subject to a number of security concerns, however.

By way of illustration, Kerberos is a conventional technology for performing authentication and authorization separately. Using Kerberos, a token is generated in an authentication process, and is used for authorization. However, both a service server and a client receive keys through a Key Distribution Center (KDC), via secure transport. No keys are transported between the service server and the client. A token is service specific, and is encrypted with a key, known only to the service server. Retrieval of the token requires additional roundtrips between a client and the KDC server.

Another emerging trend is the use of extensible authentication protocol (EAP) for authentication of mobile nodes at AAA servers. Key generation capabilities of EAP servers [EAPKEYING] [USRK], combined with the addition of EAP as an authentication method for IKEv2 [IKEv2], and use of backend Diameter servers and infrastructure [RFC4072], have made EAP a popular authentication method—as compared to customized authentication and key management mechanisms defined for MIPv4 or Kerberos. Once EAP authentication is performed successfully, and EAP master session keys (MSK and EMSK) are generated, a server will be able to use these keys to generate root keys for a variety of uses—such as MIPv6 [MIP-USRK].

Since MIPv6 operation requires bootstrapping of various parameters—such as home address, home agent address, and IPsec security associations—efforts in the IETF are underway to perform such bootstrapping through AAA infrastructure. In more recent efforts, the IPSec association required for MIPv6 operation between a mobile node (MN) and a home agent (HA) is established using IKEv2. To get around the need for pre-shared key for IKEv2 authentication, the MN authenticates through a MIP home agent (HA) to a backend AAAn, using EAP. Thus, EAP authentication is done as part of an IKEv2 exchange. However, the authentication of an MN is only part of the MIP service establishment procedure. Once the MN completes the IKEv2-EAP authentication, and establishes an IPsec channel with the HA, it still needs to be authorized for use MIP service. This typically means that an authorization server (usually also an AAA server) needs to perform the act of authorization.

The recent trend on separation of access service from mobility service, leads to newer design that separates the act of EAP authentication from the act of authorization for MIPv6 service. Under this paradigm, a peer and AAA client first run an EAP authentication with an authenticating AAA server—referred to as AAA-EAP or AAAn. The peer then requests MIPv6 service authorization from an authorizing server—referred to as MIPAAA or AAAz. It has been suggested that there may be scenarios where AAAn and AAAz are logically or physically different servers, and may not have access to the same database. A number of security and operation considerations arise in such scenarios For instance, an AAAn server that only performs authentication is not only unaware of future service requests by a peer, but also is not able to provide any such authorization. However an AAAn, as an entity performing EAP, is the only entity allowed to cache EMSK—since EMSK is not allowed to be transported outside AAAn [EAPKEYING]. This means that root keys for other usages—such as MIPv6_USRK (Mobile IPv6 usage specific root key)—can only be generated at and by the AAAn. In contrast, MIP service is authorized only at AAAz. This means that the MIPv6-USRK must be created only after such authorization, and be accessible to the AAAz for generation of other MIPv6 security keys. Furthermore, generation of MIPv6_USRK requires access to other "usage data" specific for Mobile IPv6; which is typically not available at the AAAn. Thus, the AAAz must make the "usage data" available to the AAAn, and request MIPv6_USRK from the AAAn, in order to be able to generate further MIPv6 keys.

In further consideration, most traditional authorization frameworks simply do not have any special credential-based procedure for authorization. An authorization decision itself is performed based a user profile available at a server—not based on a credential presented by a client as proof for a right of access to service. As long as the client is previously authenticated, the client's identity is used against its profile in a database. Under this scheme, using the movie theater analogy, a person walks into a movie theater and—instead of paying for a ticket as a proof of right to view a movie—the person simply shows some identification. Based on the person's identity, and upon some movie theater membership list—the person is allowed to just walk into the theater without a ticket.

However, such separation of authorization from authentication means that an authorizing server (AAAz) needs an assurance of previous authentication from an authenticating server (AAAn). Even if an identical peer identifier is used for both authentication and authorization requests with AAAn and AAAz, respectively, there is still no explicit proof presented to the AAAz that the peer has proved this identity to the AAAn. Furthermore, the lack of a prior state—especially the lack of established security association between the peer (e.g., an MN in MIP protocol) and the AAAz—has a cascading effect on security problems. A rogue MN (or even an AAA client) could potentially use a spoofed identity (for a legitimate subscriber) to send service requests on behalf of a legitimate MN, and have charges for rendered services transferred to the legitimate MN. Existence of an MN-HA IPsec association can protect service requests on the MN-HA path to the AAAz, but does not provide any integrity or non-repudiation protection for MN service requests outside the MN-HA. Any proxy or middle man (including the HA itself) on the path from HA to the AAAz can modify a service request. So it is important that when AAAz receives a service request from an MN, it can confirm that the MN has already been authenticated by an AAAn, and is using the same authenticated identity for its service request—so that the AAAz can authorize service for a legitimate MN.

In consideration of all of this, there is a need for a system where authentication and authorization are performed separately and securely. There is also a need for a system performing authentication and authorization separately that provides Authentication Authorization and Accounting (AAA) services with high performance and low complexity.

SUMMARY OF THE INVENTION

The present invention provides a system, comprising various methods and apparatus, for using an authorization token to separate authentication and authorization services. The system authenticates a client to an authenticating server; generates an authorization token with the authenticating server and the client; and authorizes services for the client using the generated authorization token. The system thus performs the authentication and authorization services separately, and provides satisfactory service security and performances.

Embodiments of the present invention provide an MN capability to assure an AAAz of a previous authentication with an AAAn. The AAAz is able to verify this authentication with the AAAn, and obtain security material (e.g., MIPv6_USRK) required for operation of MIPv6 signaling. By providing explicit assurance from the MN within a service request to the AAAz, chances of spoofing and theft of service are significantly reduced. Architecture having separate AAAn and AAAz is thus provided.

Following a successful EAP authentication, and prior to a service request, an MN—using authentication states—and an AAAn both create an extended master session key (EMSK) that may later be utilized to create MIPv6-USRK. The MN may use MIPv6 specific parameters to generate MIPv6-USRK on its own, and then create a SERVICE_TOKEN_KEY to sign its request for MIPv6 service. When the MN is ready to send a service request, it includes a signature using SERVICE_TOKEN_KEY and transmits the request. Once an AAAz receives that service request, it forwards the service request to an AAAn, together with usage data that relates to MIPv6 service. The AAAn may, after finding the MN's authentication state (including EMSK), verify the MN's authentication. Utilizing usage data sent by the AAAz, and EMSK, the AAAn may: create MIPv6_USRK and SERVICE_TOKEN_KEY; verify MN signature on a service request; or send a confirmation, together with MIPv6_USRK, back to the AAAz.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a diagram depicting an illustrative embodiment of a MN MIPv6_AUTHORIZATION_OPTION in accordance with the present invention.

DETAILED DESCRIPTION

Figure 1:
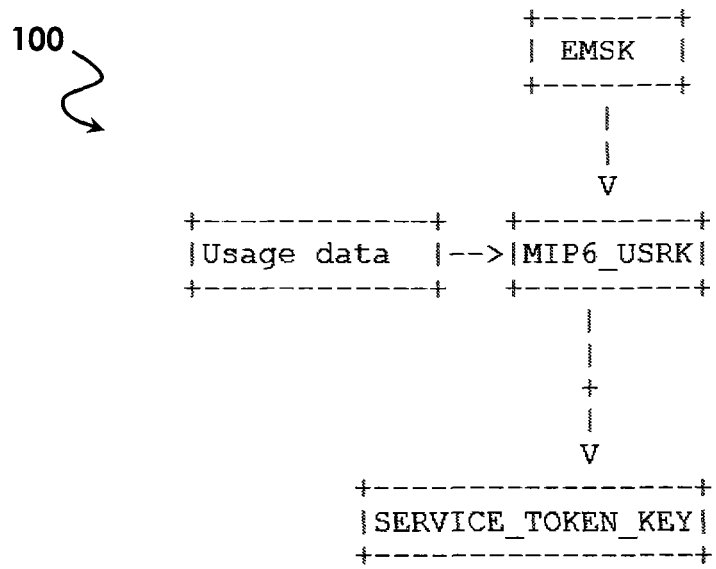
FIG. 1 is a diagram depicting an illustrative MIPv6 key hierarchy, resulting from EAP Authentication, according to the present invention.

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention provides a system for using an authorization token to separate authentication and authorization services. The system separates the act of authentication from the act of authorization, and performs authentication or authorization through separate Authentication Authorization and Accounting (AAA) servers. A client may first authenticate to an authenticating AAA (AAAN) server, create an authorization token, and then later present the token to a different authorizing AAA (AAAZ) server; while requesting an access for a specific service.

Following a successful authentication, an AAAN server and a client may create a key (TOKEN_KEY) for signing a generic authorization token. Later, the client (or service equipment acting on behalf of the client) asks an AAAZ for service authorization. The client may sign its authorization request with either the TOKEN_KEY as is, or a child key of the TOKEN_KEY tied to a specific service—e.g., a SERVICE_TOKEN_KEY (generation includes service-related information). When an AAAZ server receives such a request, it may contact the AAAN server for the SERVICE_TOKEN_KEY, and verify that the client has been properly authenticated. It may then reach the user profile (based on user's identity), and make a proper authorization decision.

Using the earlier analogy of movie tickets, an authorization token is similar to a movie ticket. A user buying a movie ticket may need to show proper identification credentials (e.g., driver's license, credit card) at a ticket counter in order to authenticate their access to a particular resource or service (e.g., sufficient age to enter a theater showing an "R" rated movie). Once the user has thus been properly authenticated, they are granted authorization (e.g., a movie ticket) to gain access. Once the ticket is purchased, obtaining access (e.g., entering into the theater) only requires establishing authorization (e.g., showing the ticket), but not authentication.

In certain embodiments of the present invention, an Extensible Authentication Protocol (EAP) is provided for authentication, while a Mobile Internet Protocol (MIP) is provided as a service. In some embodiments, for example, an operator may need to deploy an AAA_EAP as an authenticating AAA (AAAN) server, and an AAA_MIP for a Mobile IP service (AAAZ); or a mobility provider may only deploy an AAA_MIP, while relying on another operator for network access and authentication (AAA_EAP).

A mobile node with EAP client functionality may authenticate to an AAA_EAP using EAP authentication—either via a Home Agent (HA), or other suitable entity—as a pass-through authenticator. Authentication may be performed by any suitable method. Following a successful authentication, the client and AAA_EAP may generate EAP master session keys (MSK or EMSK), or other shared secret authentication keys. For ease of reference, such secret authentication keys may be referred to as Master Keys (MKs). A MK is available at both AAA_EAP and the client, at the end of an EAP authentication.

An AAA server and the client may create a TOKEN_KEY from an MK as follows:
TOKEN_KEY=PRF(MK, key generation data);
where PRF (Pseudo Random Function) may comprise a one way cryptographic function, or other function or operation that renders efforts to deduct input data from output data nearly impossible. The key generation data may include: an ASCII label, such as "Authorization key generation"; client identity; AAA_EAP server identity; key length; or other optional fields. Both client and AAA_EAP must have access to key generation data, so that they may both create TOKEN_KEY.

Upon receipt of an EAP_Success message, the client may generate TOKEN_KEY in the same manner as the AAA_EAP server. If there are fields that the client does not have knowledge of, the AAA_EAP server may send information of those fields through an AAA protocol to an AAA client—acting as EAP pass-through—which in turn sends that information to the client through available links. The client may also obtain unknown field information through Mobile IP extensions. The client may create a service request such as, for example, a registration request, or a binding update in MIP. Since a service request may be forwarded to AAA MIP (AAAZ)—possibly through a MIP Home Agent (HA)—the client may include a MIP extension (i.e., authorization extension), to verify that the client has been authenticated to that AAA_EAP.

The authorization extension (MIP) may include a signature of MIP messaging data—such as a message authentication code (MAC). This may be formed via a relevant registration request, or via binding update data—such as a Mobile node identification, etc. A signing key used by a client is a SERVICE_TOKEN_KEY. For the sake of simplicity, a TOKEN_KEY may be used as a SERVICE_TOKEN_KEY. A process for generating a SERVICE_TOKEN_KEY may take the form of:
SERVICE_TOKEN_KEY=PRF(TOKEN_KEY, service-data);
where service-data is data related to services being requested. In this example, service-data is data related to MIP services.

An HA—upon receiving a MIP message including an authorization extension—may extract signature and include it in an AAA attribute/AVP, together with the MIP service request, to the AAA_MIP. The AAA_MIP may, after receiving the request, contact the AAA_EAP to retrieve the SERVICE_TOKEN_KEY; and to verify the MAC submitted by the client. When the MAC signature is verified successfully, the AAA_MIP may authorize MIP service accordingly.

For purposes of explanation and illustration, the present invention is further described in greater detail hereinafter in relation to a MIPv6 application. In order to sufficiently tie authentication and authorization procedures between potentially different AAA servers, an AAAz may confirm previous authentication of an MN, and receive usage specific root keys (USRK). When an MN is ready to send a service request, it includes an authorization processing parameter—called a network service identifier (NSI)—with the service request to the AAAz, through a service agent (e.g., HA), which acts as an AAA client for AAAz. Since the MN is ready to request MIPv6 service, it has access to usage data. Using an EMSK rendered from EAP, the MN is able to generate a root key for MIPv6 service (MIP6_USRK). The MN may also generate a SERVICE_TOKEN_KEY from the MIP6_USRK to "sign" its request for MIPv6 service.

Once the AAAz receives the service request, it forwards the service request to the AAAn, along with usage data. The AAAn may search for the MN's authentication state (including EMSK), and verify the MN's authentication. Utilizing the usage data sent by AAAz, and EMSK, the AAAn may: generate MIPv6_USRK and SERVICE_TOKEN_KEY; verify the MN signature on the service request; and send a confirmation, along with MIPv6_USRK, back to the AAAz.

One embodiment of a keying hierarchy is described in reference to FIG. 1, which illustratively depicts a keying hierarchy diagram 100—illustrating an authorization process. As noted, AAAn holds an EMSK and thus—upon receiving service data—may generate MIPv6_USRK. SERVICE_TOKEN_KEY and, optionally, Auth_ID may be generated from MIPv6_USRK. This process may take the form of:
SERVICE_TOKEN_KEY=PRF (MIP6_USRK, "service token key derivation"|MN_ID|AAAz_ID|Service_type|length);
where the length of SERVICE_TOKEN_KEY is 128 bits. MN_ID and AAAz_ID identify the two entities who share the key.

Figure 2:
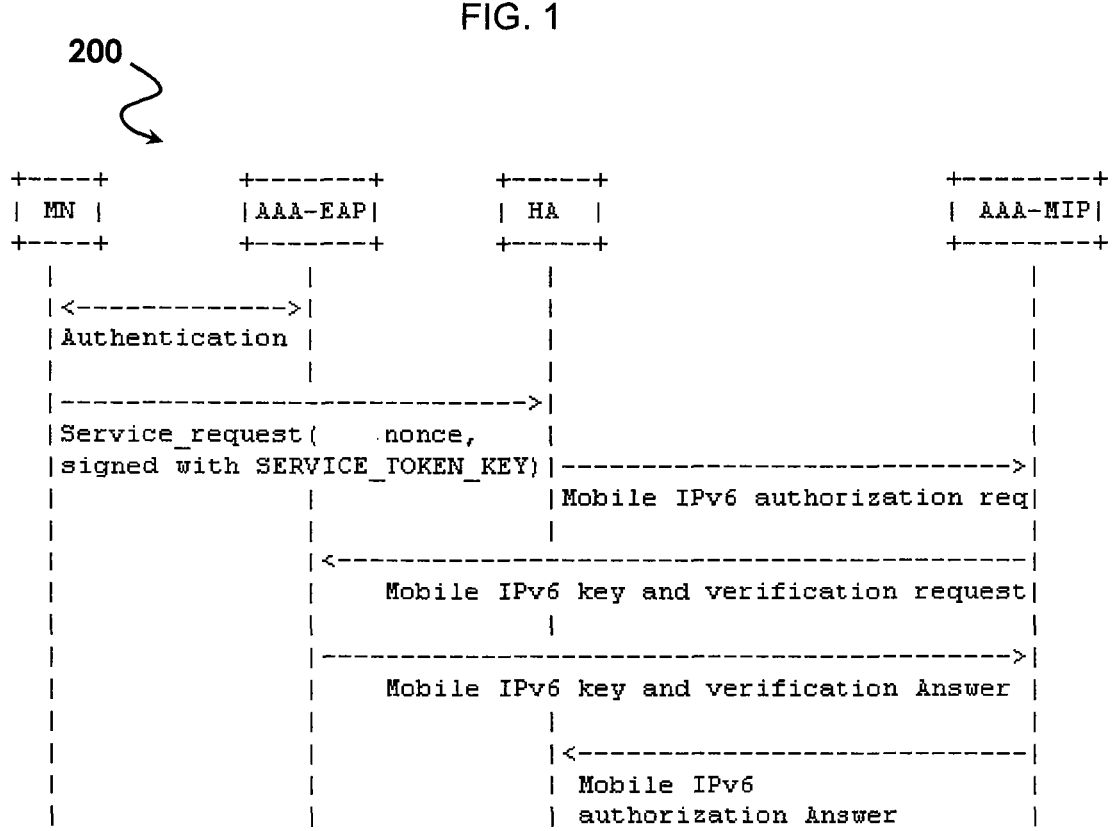
FIG. 2 depicts an illustrative example of an MIPv6 authorization procedure in accordance with the present invention.

Referring now to FIG. 2, a depiction of one embodiment of a MIPv6 authorization procedure 200 in accordance with the present invention is illustrated. In procedure 200, after a successful authentication (i.e., EAP is utilized for authentication), AAAn sends a Diameter EAP answer (DEA) to an AAA client (HA). Upon reception of indication of successful EAP, or IKE configuration messaging, an MN initiates an authorization process—by first generating MIPv6_USRK, an NSI, and a SERVICE_TOKEN_KEY.

In the example of a MIPv6 application, a service request may be a binding update (BU). The MN adds an "MN_MIP6_Authorization_option"—a mobility option—to the BU. This mobility option comprises an authenticator field (i.e., a MAC) to protect the message and extension from tampering, and to provide assurance of a previous authentication.

A SERVICE_TOKEN_KEY, derived from MIPv6-USRK, may be used for creation of a MAC. In such instances, NSI is not used for purposes of identification. In fact, the same identity used for authentication to AAAn may be used again. An MN may, for example, use an NAI extension for this purpose. Upon reception of an MIPv6 BU message, an HA—as an AAA client of an AAAz—creates an MIPv6 authorization command for the AAAz. The HA inserts data, included in the MN_MIP6v_Authorization_option, inside an AVP for this command. An HA also includes User_Name AVP in the MIPv6 authorization request, to identify a particular MN. User_Name AVP carries the same MN identity as that previously used for authentication.

For the MIPv6 authorization request message, the AAAz first ensures that the MN is previously authorized. The AAAz investigates location of the AAAn that authenticated the MN, based on the MIPv6 Authorization Request, and sends a "Mobile IPv6 Key and verification request" (MKVR) command to the AAAn. This command may serve several purposes, including: an AAAz requesting an AAAn to verify a MAC signature, and thereby assure AAAz that an MN has already been authenticated; and to request creation a MIP6_USRK for usage at AAAz.

The AAAn needs usage data for MIPv6 (as found in [MIP_USRK]) to be able to calculate MIP6_USRK. Thus, an AAAz must also include usage data—required for creation of MIP6_USRK—to the AAAn [USRK]. Usage data is included inside a "MIP6_Usage_data" AVP. Transport of usage data to AAAn is important, since AAAn (AAA_EAP) has the EMSK, while AAAn may not have access to Mobile IPv6 related data. AAAz may get part of usage data from the HA or MN.

After receiving a MKVR command from a AAAz, the AAAn performs several checks. The AAAn looks for key material (EMSK) stored for the MN, proceeds with creating MIP6-USRK using EMSK, and then generates SERVICE_TOKEN_KEY to check the MN signature. If the signature verification succeeds, the AAAn sends a MIPv6 key and verification answer (MKVA) back to the AAAz. This command verifies that MN has already been authenticated by the AAAn, so that AAAz can authorize MN for MIPv6 service, and includes the MIP6_USRK for AAAz usage. Therefore, MIP6_USRK AVP must be encrypted, using a previously established AAAn-AAAz security association (e.g. a AAAn-AAAz key encryption key). In the event that verification fails, MKVA includes an Authorization_Result AVP indicating the failure. When it receives an MKVA command, an AAAz may create other MIP6 child keys, using the received MIP6_USRK, and authorize the MN for Mobile IPv6 service—by sending a MIPv6 authorization answer to the AAA client (HA)

Upon receiving a MIPv6 authorization answer (MAA) message, an HA may obtain authorization result and MIP6 related keys. If authorization fails, the HA notifies the MN in the binding acknowledgement message. MN MIPv6_AUTHORIZATION_OPTION is an extension for MIPv6, and it comprises a service authorization request—which, for MIPv6, is a binding update sent to the HA. The option is designed to facilitate mobility and the MAC signature.

This is illustratively depicted in FIG. 3, which presents a diagram 300 representing an embodiment of a MN MIPv6_AUTHORIZATION_OPTION in accordance with the present invention. Here, type is assigned by IANA. The length of the option may depend on the length of a MAC. MN_ID is the same MN identifier used for previous authentication, and so may seem minimally redundant. Inclusion of a service type field within a MIPv6 option may also seem redundant. However, such inclusions may make conversion of such an MIPv6 option to other AVPs less complicated.

In instances where bandwidth limitation for links between an MN and an HA is of concern, this field may be dropped and added by the HA to a Diameter AVP. The length of "Service Type" is adaptable—based upon a number of systems factors, and emerging industry definitions and standards (e.g., IETF USRK definition efforts). MAC is an authenticator field for this option, and may be calculated as follows:

MAC=First (128, HMAC_SHA1 (SERVICE_TOKEN_KEY, Authorization data);

where

Authorization data=(optional data|MN_ID|Service_type). Note that optional data may include AAAn realm information, and thereby serve as an indicator of the AAA server that authenticated the MN, and possible generated parts of Auth_ID.

The present invention thus provides an end client the ability to use an initial EAP authentication procedure to create an authorization token on its own, for each service request. Although the present invention is—for purposes of illustration and explanation—described above in relation to MIP, it is not limited exclusively to MIP, and may be applied to other service technologies or applications.

The system of the present invention also provides ability for an AAA_EAP to interact with authorization processes, without advance notification of the specific nature of a service being authorized. The system of the present invention provides EAP key hierarchy, and generates specific authorization keys from EAP—hiding MKs from all entities other than an AAA_EAP and clients. The system of the present invention utilizes MIP extensions to carry authorization token data from a mobile node to an AAAz, through an HA, and uses an AAA protocol attribute to carry authorization token data over an AAA protocol. The system of the present invention eliminates intervention of intermediary service equipments—such as MIP HA—in a verification process. This eliminates security issues related to an HA, such as an HA launching a "man in middle" attack. The system of the present invention also eliminates the need for an HA to function as an EAP pass-through authenticator, during an initial EAP authentication. According to the present invention, an HA does not have to be part of an authentication infrastructure.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of separating authentication and authorization services in a communications system, comprising the steps of:
   authenticating a client node via an authenticating server;
   receiving, by an authorizing server, a service request from the client node, wherein the service request is signed by using a token key generated by the client node;
   forwarding, by the authorizing server, the service request and usage data for the requested service to the authenticating server, and receiving a confirmation and a service usage specific root key (USRK) from the authenticating server, wherein the USRK is generated based upon the usage data; and
   authorizing, by the authorizing server, the client node for the requested service based upon the confirmation and the USRK, wherein an Extensible Authentication Protocol (EAP) master session key (EMSK) is generated, wherein the token key or the USRK is generated based on the EMSK.

2. The method of claim 1, wherein the authorizing server authorizes the client service request, based upon an existence of a client signature, but without the authorizing server authenticating client identity.

3. The method of claim 1, wherein the token key is generated by using a master key which is generated by the client node after a successful authentication.

4. The method of claim 3, further comprising:
   by the authenticating server, searching for the client node's authentication state, verifying the client node's authentication, and generating the USRK by using the usage data sent from the authorizing server, and sending the confirmation and the generated USRK to the authorizing server, after the authenticating server receives the service request forwarded from the authorizing server.

5. A method by which a Mobile IP authorization request from a client node, and authentication of the client node, may be separated logically, comprising the steps of:
   authenticating the client node via an authenticating server;
   receiving, by an authorizing server, a Mobile IP service request from the client node, wherein the Mobile IP service request is signed by using a token key generated by the client node;
   forwarding, by the authorizing server, the Mobile IP service request and usage data for the requested service to the authenticating server, and receiving a confirmation and a service usage specific root key (USRK) for the Mobile IP service from the authenticating server, wherein the USRK is generated based upon the usage data; and
   authorizing, by the authorizing server, the client node for the requested service based upon the confirmation and the USRK for the Mobile IP service, wherein an Extensible Authentication Protocol (EAP) master session key (EMSK) is generated, wherein the token key or the USRK is generated based on the EMSK.

6. The method of claim 5, wherein the authorizing server is different from the authenticating AAA server, in at least one logical or physical aspect.

7. The method of claim 5, wherein authentication between a computer node and the authenticating server is performed based on credentials belonging to at least the computer node or a user utilizing the computer node.

8. The method of claim 7, wherein the credentials are user credentials.

9. The method of claim 7, wherein the credentials are device credentials.

10. The method of claim 5, further comprising the step of generating a Mobile IP root key using Mobile IP specific input data.

11. The method of claim 10, wherein a key generating server creates the root key, based upon a service specific request from at least one of the client node, a service agent, and the authorizing server.

12. The method of claim 5, wherein a computer node protects binding update integrity of the Mobile IP, providing a signing key to sign either part of a binding update, or a derivative service request.

13. The method of claim 5, wherein the client node includes a signature inside an extension to a binding update sent to a home agent.

14. The method of claim 5, wherein securing the Mobile IP service request comprises a computer node protecting service request integrity by using a set of credentials to encrypt at least part of a binding update into a token to be carried by the binding update.

15. The method of claim 5, wherein the authorizing server sends a request to either the authenticating or a key-generating server, prompting a required set of key material to perform verification of correctness for a local service request.

16. The method of claim 15, wherein either the key generating or the authenticating server will send key material to the authorizing server in a secure manner.

17. The method of claim 15, wherein the authorizing server uses AAA signaling and attributes for communicating to either the authenticating server or a verifying server.

18. The method of claim 5 wherein the token key is generated by using a master key which is generated by the client node after a successful authentication.

19. The method of claim 18, further comprising:
   by the authenticating server, searching for the client node's authentication state, verifying the client node's authentication, and generating the USRK by using the usage data sent from the authorizing server, and sending the confirmation and the generated USRK to the authorizing server, after the authenticating server receives the service request forwarded from the authorizing server.

* * * * *